United States Patent [19]
Koga

[11] Patent Number: 4,487,819
[45] Date of Patent: Dec. 11, 1984

[54] FLAT BATTERY

[75] Inventor: Ryoji Koga, Kawaguchiko, Japan

[73] Assignee: Kawaguchiko Seimitsu Company Limited, Yamanashi, Japan

[21] Appl. No.: 452,391

[22] Filed: Dec. 22, 1982

[30] Foreign Application Priority Data

Dec. 26, 1981 [JP] Japan .................................. 56-213908
Feb. 4, 1982 [JP] Japan .................................. 57-16875
Feb. 19, 1982 [JP] Japan .................................. 57-26547
Feb. 27, 1982 [JP] Japan .................................. 57-31050

[51] Int. Cl.³ ........................ H01M 2/12; H01M 2/08
[52] U.S. Cl. ..................................... 429/82; 429/163; 429/174
[58] Field of Search ............... 429/174, 162, 163, 164, 429/166, 171, 172, 173, 185, 82, 219

[56] References Cited

U.S. PATENT DOCUMENTS

| | | | |
|---|---|---|---|
| 2,307,764 | 1/1943 | Deibel et al. | 429/164 |
| 2,843,650 | 7/1958 | Jacquier | 429/174 |
| 3,723,184 | 3/1973 | Stark et al. | 429/174 |

FOREIGN PATENT DOCUMENTS

| | | | |
|---|---|---|---|
| 111060 | 8/1980 | Japan | 429/174 |
| 13665 | 1/1982 | Japan | 429/174 |
| 95066 | 6/1982 | Japan | 429/174 |

*Primary Examiner*—Donald L. Walton
*Attorney, Agent, or Firm*—Koda and Androlia

[57] ABSTRACT

A flat battery for use in a micro-size device, including a cathode can having a substantially U-shaped cross-section, an anode can having a substantially inverted U-shaped cross-section, an anode and cathode active substances accommodated in a battery cell constituted by the cathode and anode cans, a separator provided between the anode and cathode active substances, and an insulative film provided at an upstanding portion of the cathode can to isolate the cathode can from the anode can and the anode active substance.

26 Claims, 46 Drawing Figures

FIG.22
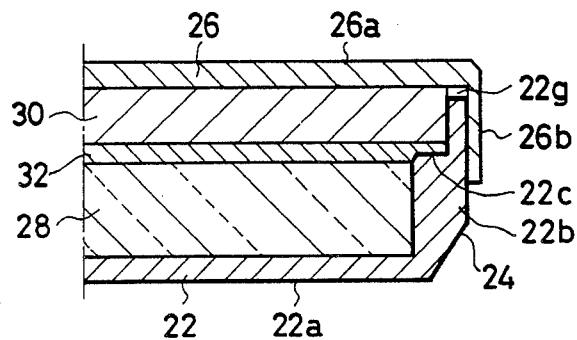
FIG.23  FIG.24
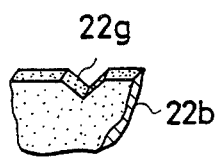 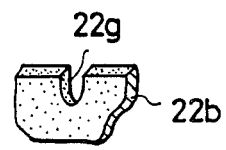
FIG.25  FIG.26
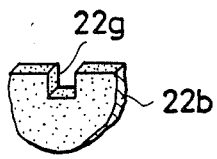 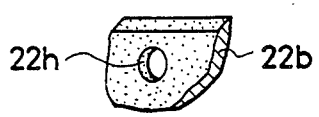

FLAT BATTERY

BACKGROUND OF THE INVENTION

1. Field of the Invention

This invention relates to a flat battery for use in a micro-size device such as a wristwatch, handy measuring or caluculating instruments and so on.

2. Prior Art

The construction of the conventional battery cell of this type consist of a cup-shaped anode can, a cap-shaped cathode can and a gasket provided between the anode and cathode cans. An anode active substance, an electrolyte, a cathode active substance and a separator are contained in such cell construction.

The sealing structure of the conventional battery above mentioned is performed by establishing close pressing contiguity among the gasket, the anode and cathode cans through use of the compressive counterforce of the gasket in which it is deformed. Therefore, it is necessary to obtain a large compressive counterforce by increasing the thickness of the gasket. However, by increasing the thickness of the gasket, the volume which is occupied by the gasket is increased, for this reason, the size of the battery becomes enlarged, or the net capacity of the cell diminishes. Otherwise, it is necessary to reduce the thickness of the plates constituting the anode and cathode cans for increasing the discharge capacity in the same size cell. Furthermore, when the compressive force of the gasket is enlarged in order to ensure the leakproof property, the internal pressure of the battery cell increases, this lead to one of the causes of leakage.

SUMMARY OF THE INVENTION

Main object of the present invention intend to present the construction of the micro battery cell to accomplish the improvement of the leakage of the electrolyte and the increasing of the discharge capacity in the definite dimension of the cell. Therefore, the contents which are contained in the cell construction presented hereof is adaptable the heretofore conventional and widly used members that are the anode active substance, the separator, the cathode active substance and the electrolyte. And then, it is also acceptable for this present invention to use the material which will be hereafter improved.

It is another object of the present invention to provide a flat battery which can overcome the shortcomings encountered in the prior art.

It is another object of the present invention to provide a flat battery which provides an anlargement of the internal volume without enlarging a size of the battery cell, an increase of the discharge capacity and reliable leakproof.

To realize the principles of the present invention, the above-mentioned objects are accomplished by a flat battery, comprising: a cathode can including a bottom portion and a cylindrical upstanding portion extending upward from the outer circumference of said bottom portion; an insulative film provided at said cylindrical upstanding portion of said cathode can; a cathode active substance electrically contacted to said cathode can; an anode can including an upper portion and a cylindrical portion extending downward from the outer circumference of said upper portion; an anode active substance electrically contacted to said anode can; and a separator isolating said cathode active substance and anode active substance to prevent an electrical short-circuit; wherein said cylindrical portion of said anode can is fitted to said cylindrical upstanding portion of said cathode can through the intermediary of said insulative film for setting said anode can on said cathode can.

BRIEF DESCRIPTION OF THE DRAWINGS

Other and further objects, features and advantage of the present invention will be more apparent by reference to the following detailed description of the invention taken in connection with the accompanying drawings, in which:

FIG. 22 is a longitudinal sectional view of another modification of the flat battery shown in FIG. 2 or 5;

FIGS. 23 to 26 are partially enlarged views of an air venting portion of the flat battery shown in FIG. 22;

DETAILED DESCRIPTION OF THE INVENTION

Figure 1:
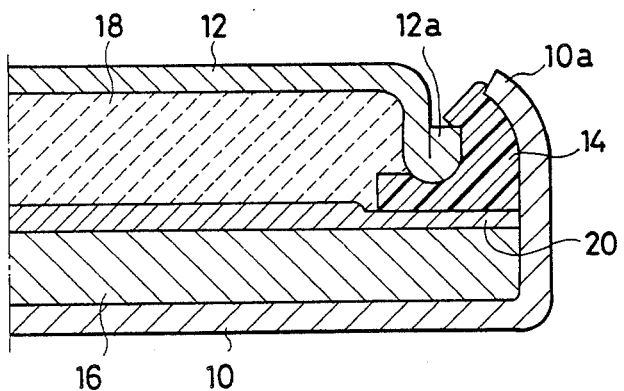
FIG. 1 is a longitudinal sectional view of a conventional flat battery, showing one-half of the battery.

The construction of the conventional battery of this type is described with reference to the longitudinal sectional view of FIG. 1, showing one-half of the battery.

In FIG. 1, the battery comprises a cup-shaped anode can 10 made of a metallic material, and a capshaped cathode can 12 also made of a metallic material. A gasket 14 comprising an insulator is located between the anode can 10 and a curled portion 12a of the cathode can 12, and is held the compressed state by bending inwardly the rim at the upper opening 10a of the anode can 10. An anode active substance 16, an electrolyte, a cathode active substance 18 and a separator 20 which isolate said anode active substance 16 from said cathode active substance are contained in the battery cell.

The anode and cathode cans 10, 12 of this conventional flat battery are insulated by the gasket 14 which makes the compressive counterforce between the two cans 10, 12, whereby the sealing structure of the conventional flat battery is performed. In addition, it is necessary to increase the thickness of the gasket 14 for the sake of the acquisition of a suitable compressive counterforce. However, the volume which is occupied by the gasket 14 is in propotion to the thickness of the gasket 14, then it is necessary to either reduce the thickness of the plates constituting the cans or increase the overall volume of the battery for the purpose of increasing the discharge capacity at the definite dimension of the cell. Furthermore, when the compressive force of the gasket 14 is enlarged in order to ensure the leakproof property, the curled portion 12a of the cathode can 12 is moved inwardly by the compressive force of the gasket 14. Consequently the internal pressure of the battery cell increases. In addition, the creep deterioration of the gasket 14 is advanced by increasing the compressive force of the gasket 14, this lead to one of the causes of leakage.

Figure 2:
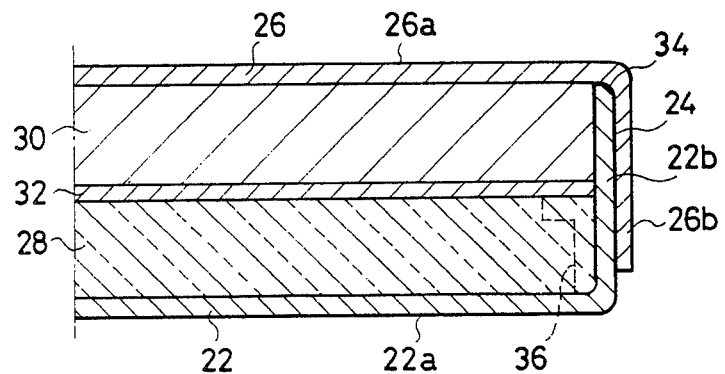
FIG. 2 is a longitudinal sectional view of an embodiment of a flat battery according to the present invention, showing one-half of the battery.

FIG. 2 is a longitudinal sectional view of the embodiment of the flat battery according to the present invention, showing one-half of the battery. The arrangement of the cans is inverted relative to the conventional arrangement of FIG. 1 in view of the assembly operation. In FIG. 2, a cathode can 22 has a substantially U-shaped cross-section and is made of a metallic material consisting of brass or steel having nickel layer on a surface thereof, or the like. The cathode can 22 is basically constituted by a bottom portion 22a and a cylindrical upstanding portion 22b extending vertically upward from the outer circumference of the bottom flat portion 22a. The upper surface and the surfaces of the outer and inner sides of the upstanding portion 22b is coated with a insulative film 24 composed of a fluorine-type film or the like to insulate from the anode can 26 and anode active substance. The insulative film 24 which coats the cathode can may be provided to any place where is necessary for preventing the inner short-circuit, for example contact portion of the cathode can and the anode can or anode active substance. The anode can 26 has a substantially inverted U-shaped cross-section and is made of a metallic material consisting of brass or steel having nickel layer on a surface thereof, or the like. The anode can 26 is constituted by an upper flat portion 26a and a cylindrical portion 26b bent vertically downward from the outer circumference of the upper portion 26a. The cylindrical portion 26b of the anode can 26 is fit on the outer circumferential surface of the upstanding portion 22b of the cathode can 22 by the shrinkage- or press-fitting process, whereby a secure water-tight fit is achieved through the intermediary of the insulative film 24. Numeral 28 represents generally a cathode active substance consisting of zinc as a principal ingredient and containing an electrolyte consisting of NaOH, KOH or the like. Numeral 30 denotes an anode active substance consisting of silver oxide, silver peroxide, manganese dioxide, mercury oxide, nickel hydroxide or the like as a principal ingredient, in tablet form. A separator 32 isolates the cathode active substance 28 and anode active substance 30 to prevent an electrical short-circuit. The separator 30 consists of non-weaving cloth, vinylon, cellophane or the like.

In this embodiment, the can 22 comes in contact with the cathode active substance 28 and therefore serves also as a cathode terminal, while the can 26 comes in contact with the anode active substance 30 and, hence, serves also an anode terminal. Though not illustrated, the arrangement of the cathode active substance 28 and anode active substance 30 shown in FIG. 2 may be inverted according to the requirment.

The flat battery in this embodiment is assembled by containing such contents as the cathode active substance 28, anode active substance 30 and separator 24 in the cathode can 22, and then, finally, pressure-fitting the cylindrical portion 26b of the anode can 26 on the upstanding portion 22b of the cathode can 22 using the shrinkage- or press-fitting process.

Suitable materials for the insulative film 24 are ethylene tetrafluoride and ethylene chlorotrifluoride. If there are other materials above mentioned and which have resistance against deterioration by electrolytes, an electrical insulative property, repellent property for electrolyte, elasticity and heat resistance against the high temperature at the shrinkage-fitting process. Such materials, e.g. silicon-, polyamide-, polyphenylene sulfide-, polyimide-based material, may be adaptable to the embodiment.

In accordance with the embodiment, since a packing member similar to the conventional gasket illustrated in FIG. 1 is not employed in this embodiment, it is possible to increase the ratio of the internal volume to the overall battery volume and improve the battery discharge capacity by a wide margin. Because the insulative film 24 having the excellent elasticity is sandwiched between the cylindrical portion 26b of the anode can 26 and the outer circumferential surface of the upstanding portion 22b of the cathode can 22, and the thickness of the film 24 is very thinner than the conventional gasket, and also the synergy between the internal stress occured by the pressure fitting and the film 24 having the electrolyte-repellent property prevent the creep of the electrolyte out of the inside of the cell, whereby the leakage of the electrolyte of the cell is perfected.

In FIG. 2, in addition the leak-proof property can be ensured if a sealing material 34 such as tar or silicon grease is introduced into the space portion which is constituted of the end face of the upstanding portion 22b of the cathode can 22 and the bent root of the cylindrical portion 26b of the anode can 26. It should be noted that the portion indicated by the broken line 36 in the figure is the core piece, which is purposing to support the separator can be prepared when necessary.

Figure 3:
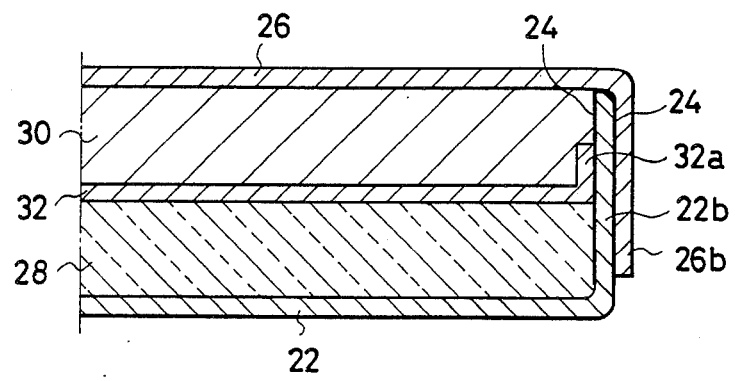
FIG. 3 is a longitudinal sectional view of another embodiment of a flat battery according to the present invention, showing one-half of the battery.
Figure 4:
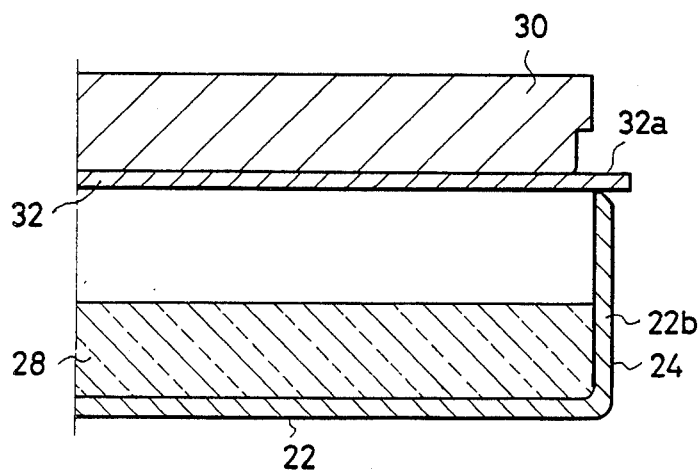
FIG. 4 is an illustrative view for describing the installation of a separator in the flat battery in FIG. 3.

FIG. 3 shows a modification of the flat battery shown in FIG. 2. Like elements corresponding to those of FIG. 2 are indicated by like numerals. An outer diameter of a separator 32 of this embodiment is made larger than the inner diameter of the cathode can 22. As shown in FIG. 4, the separator 32 is placed upon the upstanding portion 22b of the cathode can 22, then the anode active substance 30 is located on the separator 32, both the separator and the anode active substance 30 are pressed down into the cathode can 22 which is placed the cathode active substance 28 previously. In this case, this method gives the effect that the circumference of the separator gets the radial tension force in all direction and the separator adheres closely to the anode active substance 30 avoiding unnecessary air between the separator and the active substance.

Beside in this embodiment, the problem which is comprised in assembly difficulties caused when there is a variance in the diameter of the separator or an internal short-circuit caused when the diameter is too small are eliminated. Further, the separator 32 can be smoothly pressed into the cathode can 22.

Figure 5:
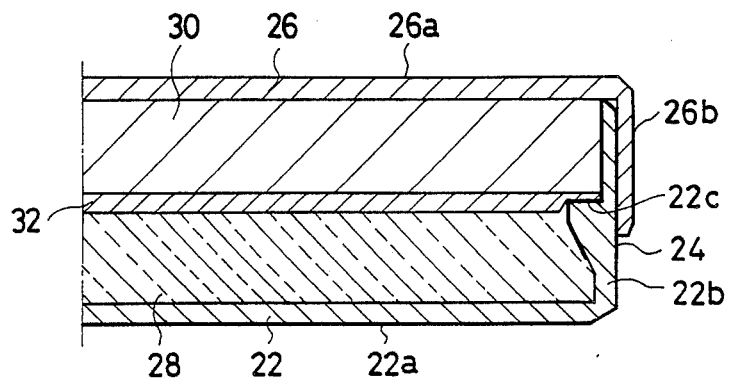
FIG. 5 is a longitudinal sectional view of another preferred embodiment of a flat battery according to the present invention, showing one-half of the battery.

FIG. 5 shows another preferred embodiment of a flat battery according to the present invention, with like parts bearing the same reference numerals as these used in FIG. 2.

In FIG. 5, the inner wall of the upstanding portion 22b of the cathode can 22 is projected with a step 22c at the middle part thereof. As shown in the partially enlarged view of FIG. 6, an inner surface 22b'', outer surface 22d' and upper surface 22b of the upstanding portion 22b and the step 22c are continuously coated with the insulative film 24.

The outer circumferential portion of the separator 32 set upon the step 22c of the cathode can 22 and isolates the cathode active substance 28 from anode active substance 30 to prevent an electrical short-circuit.

The flat battery in this embodiment is assembled as the following steps.

(1) The electrolyte-containing cathode active substance 28 is introduced into the cathode can 22.

(2) Then, the separator 32 is inserted by placing its outer peripheral portion on the insulated step 22c of the cathode can 22.

(3) The tablet-shaped anode active substance 30 is set on the separator 32 and in the insulated inside of the cathode can 22.

(4) Finally, the cylindrical portion 26b of the anode can 26 is hermetically fitted on the insulated outer circumferential surface of the upstanding portion 22b of the cathode can 22 in such a manner that the anode can 26 covers the battery components.

In FIG. 5, the outer circumferential portion of the separator 32 is sandwiched between the step 22c of the cathode can 22 and the anode active substance 30, therefore, it is possible to certainly retain the separator 32 in the construction of the cell.

Figure 6:
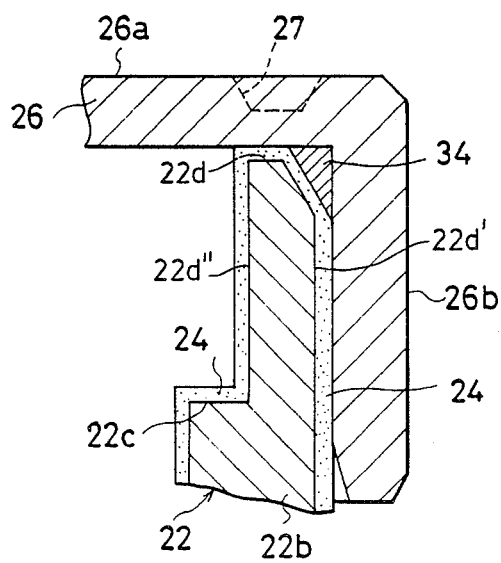
FIG. 6 is a partially enlarged view showing the fitted cans portion of the flat battery shown in FIG. 5.

As shown in FIG. 6, the leak-proof property can be further ensured if a sealing material 34 such as tar or silicon grease is used into the space portion which is comprised between the end face of the upstanding portion 22b of cathode can 22 and the bent root of the cylindrical portion 26b of the anode can 26. In FIG. 6, a ring-shaped groove 27, indicated by the broken line, provided near the outer circumferential portion of the flat upper portion 26a of the anode can 26 is proposing to increase the bending elasticity of the cylindrical portion 26 when it is fitted onto the upstanding portion 22b. The groove 27 is formed when so desired.

Figure 7:
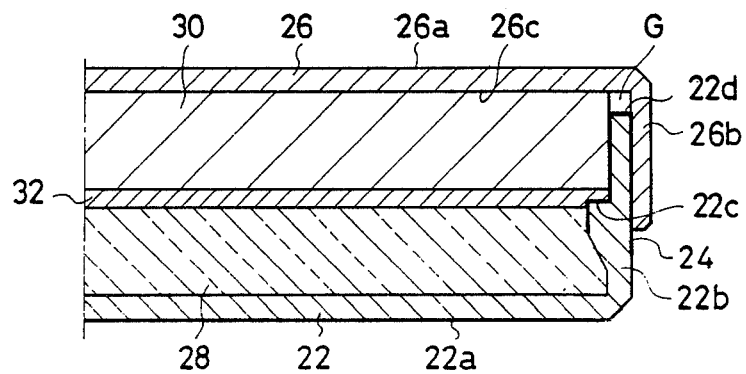
FIG. 7 is a longitudinal sectional view of a modification of the flat battery shown in FIG. 5.
Figure 8:
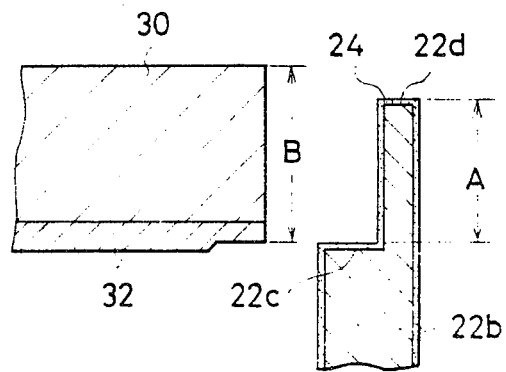
FIG. 8 is a partially enlarged view showing the distance A less than the distance B of the flat battery shown in FIG. 7.

FIG. 7 shows a modification of the flat battery shown in FIG. 5. FIG. 8 is a partially enlarged view of the flat battery shown in FIG. 7.

As shown in FIG. 8, the distance A from the step 22c of the cathode can 22 to the upper surface 22d of the upstanding portion 22b is, in this modification, so designed as to be less than the total thickness B which is determined by the anode active substance 30 and the fully compressed separator 32. Accordingly, even when the anode can 26 is pressure-fit on the cathode can 22 while pressuring the anode active substance 30, a gap G in FIG. 7 will be maintained between the inner surface 26c of the anode can 26 and the upper surface 22d of the upstanding portion 22b of cathode can 22.

Figure 9:
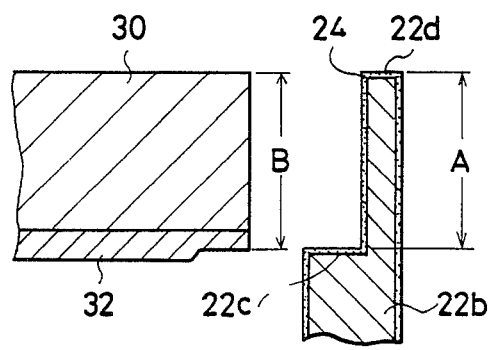
FIG. 9 is a partially enlarged view showing the distance A larger than the distance B shown in FIG. 7.

As shown in FIG. 9, if the distance A from the step 22c of the cathode can 22 to the upper surface 22d of the upstanding portion 22b were larger than the total thickness B of the separator 32 and anode active substance 30, the insulative film 24 on the upper surface 22d of the upstanding portion 22b would be pressed by the anode can 26. In this case, the film 24 may be torn by the fitting pressure of the anode can 26 when the anode can 26 is fit tightly on the cathode can 22. Further, since the anode can 26 is brought into abutting contact with the upper surface 22d of the upstanding portion 22b of the cathode can 22 before the separator 32 is compressed sufficiently through the intermediary of the anode active substance 30, the sufficient compression of the separator 32 cannot be achieved. This causes the creation of a portion through which the electrolyte may flow and gives rise to voltage instability and self-induced deterioration owing to an internal short-circuit.

In accordance with this modification, the upper surface 22d of the upstanding portion 22b of the cathode can 22 does not contact to the inner surface 26c of the anode can 26, as set forth above. It is, therefore, possible to settle the above-mentioned problems which are brought by the pressure-fitting of the anode can 26 to the cathode can 22.

Also, a further improvement in leak-proof property is made possible by putting a water-repellent filler which has fluidity, such as tar or polyacetal, in the gap G in FIG. 7 between the inner surface 26c of the anode can 26 and the upper surface 22d of the upstanding portion 22b of the cathode can 22.

Figure 10:
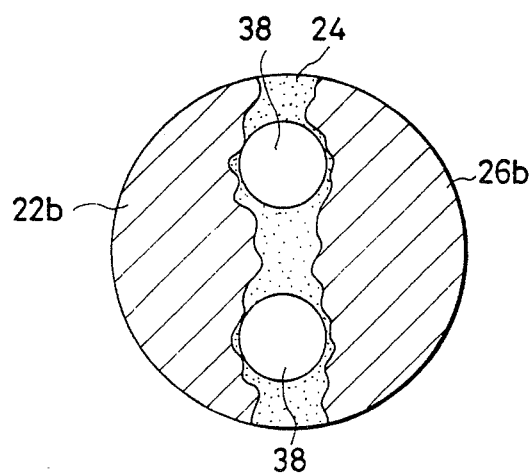
FIG. 10 is an enlarged view illustrating a portion of the insulative film interposed between the cathode can and anode can of another modification of the flat battery shown in FIG. 2 or 5.

FIG. 10 shows still another modified form of the flat battery shown in FIG. 2 or 5 (a modification of the flat battery shown in FIG. 5 is only given in the following as an example.), and is an enlarged view illustrating a portion of the insulative film 24 interposed between the cathode can 22 and anode can 26.

Numeral 38 denotes glass beads blended in the insulative film 24. The glass bead 38 has a diameter greater than the total roughness of the surfaces of the cathode can 22 and anode can 26 and therefore prevents direct contact between the surfaces of the cathode can 22 and anode can 26. When the anode can 26 and the cathode can 22 are assembled by shrinkage fits, therefore the anode can 26 and cathode can 22 will not come into direct contact with each other even if the insulative film 24 should tear owing to the partial formation of thinned sections thereof with a reduction in breakdown strength and soon caused by heat. Adopting an inclusion rate of 1 to 20% for the glass beads 38 prevents the glass beads from overlapping in the direction of thickness of the insulative film 24. The rate of inclusion of the glass beads is suppressed on the assumption that the overlapping thereof in the direction of film thickness will cause the glass beads 38 to migrate within the insulative film 24 when the anode can 26 is shrinkage-fit on the cathode can 22, such migration being accompanied by flawing of the insulative film 24.

Figure 11:
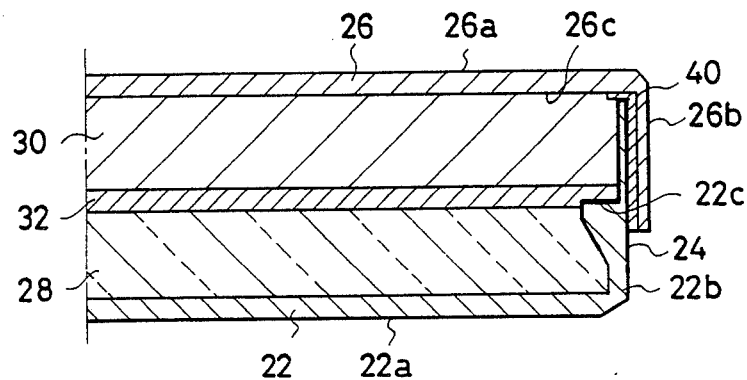
FIG. 11 is a longitudinal sectional view of a modification of the flat battery shown in FIG. 2 or 5.
Figure 12:
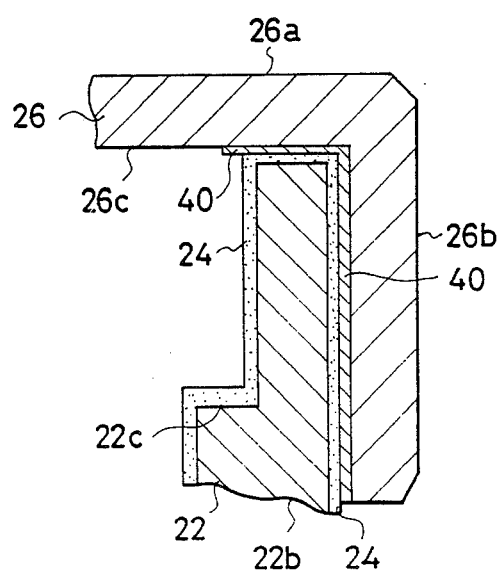
FIG. 12 is an enlarged view showing a principal portion of the flat battery shown in FIG. 11.

FIG. 11 shows still another modified form of the flat battery shown in FIG. 2 or 5 (a modification of the flat battery shown in FIG. 5 is only given in the following as an example.). FIG. 12 is an enlarged view showing a principal portion of the flat battery illustrated in FIG. 11.

As stated before, where the insulative film 24 may tear owing to a decline in the Young's modulus and breakdown strength thereof caused by heat, or where the insulative film 24 may be damaged by an externally applied force at such time that the anode can 26 is shrinkage- or press-fit onto the cathode can 22, in this modification, an insulative metallic oxide layer 40 is applied on the inner circumferential surface of the cylindrical portion 26b and on a portion of the inner surface 26c of the upper flat portion 26a of the anode can 26. Therefore, the application is such that the anode can 26 and cathode can 22 will not be short-circuited even if the insulative film 24 should be damaged.

The insulative metallic oxide layer 40 comprises an iron oxide ($Fe_3O_4$) layer provided by subjecting the part of the anode can 26 to an iron oxide treatment, or a chrome oxide (CrO) layer formed by subjecting said part of the anode can 26 to black chrome plating.

FIGS. 13 through 16 show still another modified form of the flat battery shown in FIG. 2 or 5 (a modification of the flat battery shown in FIG. 5 is only given in the following as an example.).

Reference numeral 42 denotes a metal plate of a low thermal conductivity, consisting of stainless steel, chrome or the like, which is sandwiched the upper flat portion 26a of the anode can 26 and the anode active substance 30. When the anode can 26 is shrinkage-fit on the cathode can 22, the low thermally conductive metal plate 42 prevents the heat coming off the anode can 26 from being applied directly to the anode active substance 30.

In shrinkage-fitting the anode can 26 on the cathode can 22, it is necessary to fit the anode can 26 on the cathode can 22 while the tablet-formed anode active substance 30 is pressed by the upper flat portion 26a of the anode can 26, thereby pressing the outer circumferential portion of the separator 32 into abutting contact with the step 22c of the cathode can 22 to prevent a short-circuit. If the low thermally conductive metal plate 42 is not provided, the anode can 26 and anode active substance 30 would come into direct contact. Since the anode can 26 is herted to a temperature of from 200° to 300° C. at such time, the heat would be directly transmitted to the anode active substance 30. In a case in which silver oxide is used for the anode active substance 30, when the silver oxide is heated to a temperature of above 160° C., the silver oxide gives off oxygen. The oxygen being given off in this manner elevates the internal pressure of the battery, causing the anode can to be raised so that a deterioration in electrical contact between the anode can 26 and anode active substance 30 is conceivable. If the anode can 26 should be raised, it is even conceivable that a short-circuit might occur owing to a reduction in the force restraining the separator 32.

In this modification, the low thermally conductive metal plate 42 is provided between the anode can 26 and anode active substance 30. The heat given off by the anode can 26 during shrinkage-fitting is transmitted to the anode active substance 30 after travelling through the metal conductive plate 42. Therefore, the anode can 26 can be fit on perfectly followed by rapid cooling of the anode can 26, before the heat is transmitted to the anode active substance 30. In consequence, the anode can 26 is capable of being assembled by shrinkage-fit without having any influence to the anode active substance 30.

Figure 13:
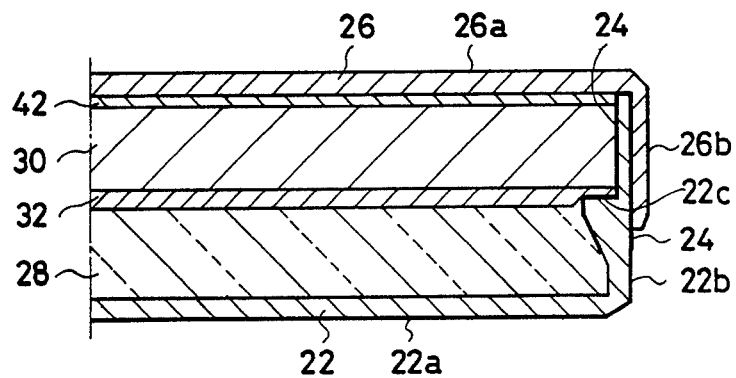
FIG. 13 is a longitudinal sectional view of another modification of the flat battery shown in FIG. 2 or 5.
Figure 14:
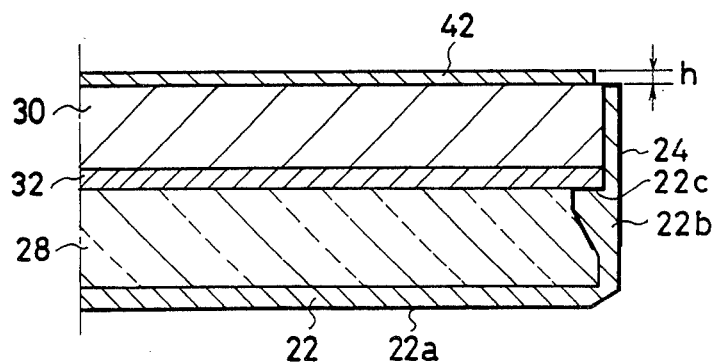
FIG. 14 is a longitudinal sectional view of one-half of the battery, illustrating the state of the thermal conductive metal which is on the anode active substance before fitting the anode can onto the cathode can in the flat battery of FIG. 13.
Figure 15:
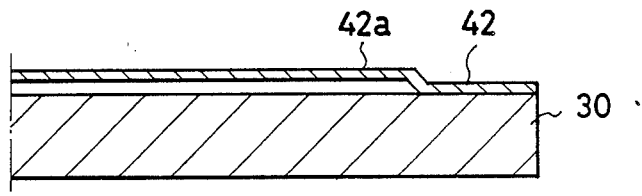
FIGS. 15 and 16 are longitudinal sectional views of modifications of the plate shown in FIG. 13.
Figure 16:
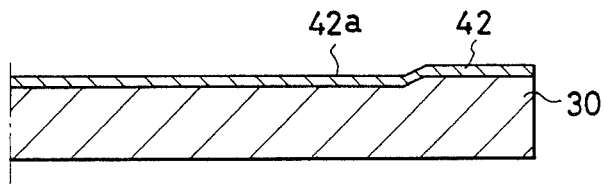

FIG. 14 is a longitudinal sectional view of one-half of the battery, illustrating the state of the thermal conductive metal which is on the anode active substance before fitting the anode can onto the cathode can 22 in the flat battery of FIG. 13. The low thermally conductive metal plate 42 projects by a height h from the upper surface of the cylindrical portion 22b of the cathode can 22. The outer circumferential portion of the separator 32 is compressed and secured by pressing the plate 42 into the cathode can 22 by means of the upper flat portion 26a of the anode can 26. In order to press the outer circumferential portion of the separator 32 with greater stability, the low thermally conductive metal plate 42 can be provided with elasticity by causing it to project at its central portion 42a, as shown in FIG. 15. In this case, a stainless steel plate or the like subjected to pressing work is employed as the plate 42. Further, as shown in FIG. 16, it is easily possible to set the plate 42 by putting the central portion 42a of the plate 42 into the center of the anode active substance 30.

Figure 17:
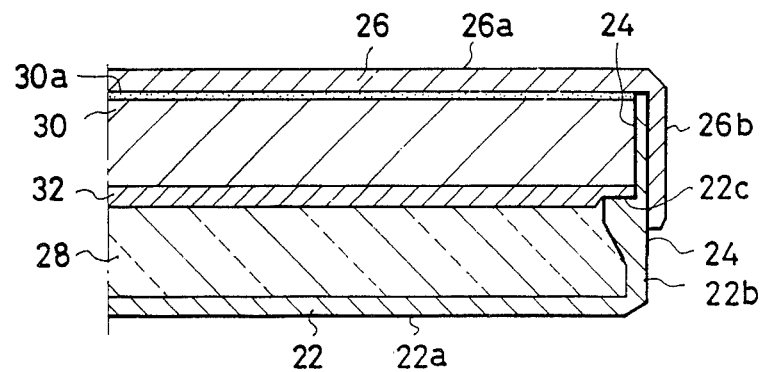
FIG. 17 is a longitudinal sectional view of another modification of the flat battery shown in FIG. 2 or 5.

FIG. 17 shows still another modified form of the flat battery shown in FIG. 2 or 5 (a modification of the flat battery shown in FIG. 5 is only given in the following as an example.).

In this modification, the anode active substance 30 comprises a graphite layer 30a at the upper surface thereof. Accordingly, the anode can be perfectly fit on the cathode can 22 followed by rapid external cooling before the heat given off by the anode can 26 is transmitted to the main component of the anode active substance. As a result, deterioration of the anode substance at the time of shrinkage-fitting as the above mentioned is prevented. The graphite layer 30a is formed on the upper surface of the tablet-formed anode active substance 30 following the formation of the same. Alternatively, since a small quantity of graphite can be mixed up with a material such as silver oxide in silver oxide or like batteries without causing difficulties, larger amount of graphite layer can be introduced on the top part of the anode active substance 30 during the formation thereof, thereby forming a graphite layer 30a comprising graphite and binder.

Figure 18:
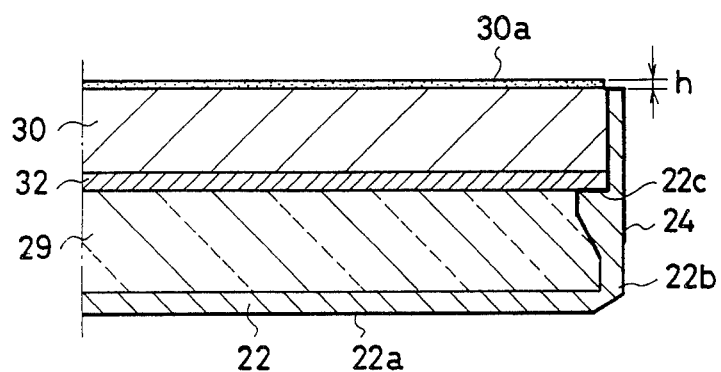
FIG. 18 is a view illustrating the state of the graphite layer which is on the anode active substance before fitting the anode can onto the cathode can in the flat battery of FIG. 17.

FIG. 18 is a view illustrating the state of the graphite layer which is on the anode active substance before fitting onto the cathode can 22 in the flat battery of FIG. 17. The tablet-formed anode active substance 30 with the graphite layer 30a on its upper surface is projecting by a height h from the cylindrical portion 22b of the cathode can 22. When shrinkage-fitting the anode can 26 on the cathode can 22, the graphite layer 30a of the anode active substance 30 is pressed by the upper flat portion 26a of the anode can 26, whereby the outer circumferential portion of the separator 32 is forced into pressing contact with the step 22c of the cathode can 22.

Figure 19:
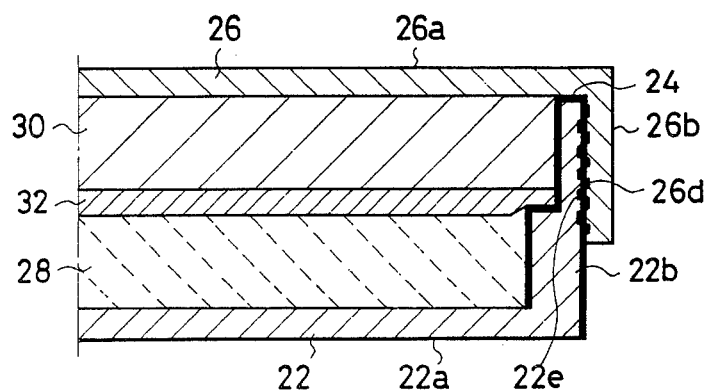
FIG. 19 is a longitudinal sectional view of another modification of the flat battery shown in FIG. 2 or 5.

FIG. 19 shows still another modified form of the flat battery shown in FIG. 2 or 5 (a modification of the flat battery shown in FIG. 5 is only given in the following as an example.). In this figure, the cathode can 22 comprises a plurality of annular grooves 22e provided at the outer circumferential surface of the upstanding portion 22b. The anode can 26 also comprises a plurality of annular grooves 26d provided at the inner peripheral surface of the cylindrical portion 26b and corresponding to the annular grooves 22e in the cathode can 22.

Figure 20:
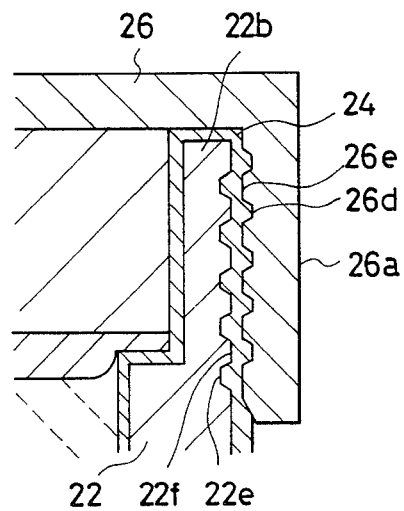
FIGS. 20 and 21 are partially enlarged views of principal portion of the flat battery illustrated in FIG. 19.
Figure 21:
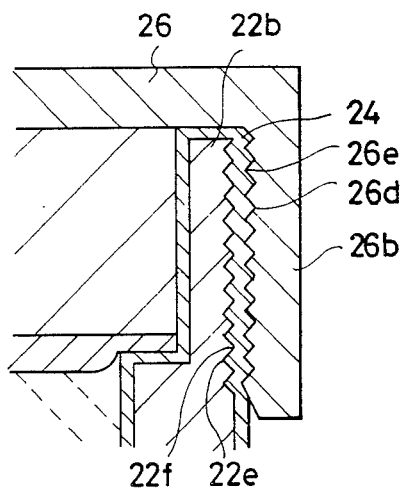

FIG. 20 is an enlarged view of a principal portion of the flat battery illustrated in FIG. 19. When the anode can 26, heated to a temperature of from 200° to 300° C., is fitted on the cathode can 22 whose upstanding portion 22b is coated with the insulative film 24, the insulative film 24 sandwiched between the two cylindrical parts of both cans 22b and 26a is softened and then bitten into by the raised portion 22f, 26e and the annular grooves 22e, 26d. Cooling the battery under these conditions causes the insulative film 24 to adhere tightly to the inner surface of the annular grooves 22e and 26d of both cans. Therefore, the anode can 26 is prevented from slipping off the cathode can 22 by the shear resistance of the film 24 in the grooves 26d. Also, as shown in FIG. 21, both the annular grooves 22e of cathode can 22 and the annular grooves 26d of anode can 26 are provided closer together, enabling the ends of the raised portions 22f, 26e between the respective annular grooves 22e, 26d to be sharpened so that they are afforded a shape that bites into the insulative film 24 with greater facility.

It should be noted that the annular grooves in this modification may be provided solely on the inner surface of the cylindrical portion 26b of the anode can 26.

FIG. 22 shows still another modified form of the flat battery shown in FIG. 2 or 5 (a modification of the flat battery shown in FIG. 5 is only given in the following as an example.). FIG. 23 is an enlarged perspective view of a principal portion of the flat battery shown in FIG. 22, and illustrates a channel 22g, namely an air venting portion, constituting the principal portion of the invention, provided in the upper surface of the cylindrical upstanding portion of the cathode can 22.

In the flat battery of this modification, the cathode active substance 28, separator 32 and anode active substance 30 are successively introduced into the cathode can 22, after which the heated anode can 26 is put in place. Then, with the upper portion 26a of the anode can 26 in intimate contact with the upper surface of the cylindrical upstanding portion 22b of the cathode can 22, cooling is effected to contact the cylindrical portion 26b of the anode can 26 so as to compress the insulative film 24 on the outer circumferential portion of the upstanding portion 22b of cathode can 22, thereby effecting the sealing of the battery.

When the upper portion 26a of the heated anode can 26 is brought into intimate contact with the upper surface of the cylindrical upstanding portion 22b of the cathode can 22, however, the battery contents are heated and undergo thermal expansion, causing the internal pressure to be raised. When the restraining force for closing the battery cans is removed, therefore, there are occasions where the anode can 26 rises from the cathode can 22. Accordingly, in this modification, the channel 22g is provided in the upper surface of the cylindrical upstanding portion 22b of the cathode can 22 so that, if the battery contents should experience thermal expansion, a quantity of air equivalent to the amount of expansion may escape into the atmosphere via the channel 22g. Other modifications of the channel 22g serving as the air venting portion are illustrated in FIGS. 24 and 25. FIG. 26 shows an embodiment of an air-venting hole 22h.

Figure 27:
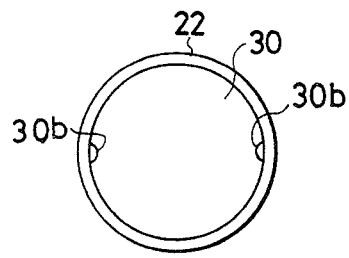
FIG. 27 is a top view of another modification of the flat battery shown in FIG. 2 or 5, with the anode can removed.

FIG. 27 shows still another modified form of the flat battery shown in FIG. 2 or 5, and is a top view of the flat battery in this modification, with the anode can 26 removed.

In this modification, the outer circumferential surface of the anode active substance 30 is provided with a plurality of grooves 30b (two grooves are shown in FIG. 27 as an example.) as an air passage for venting air when the anode active substance 30 is introduced into the cathode can 22. Most of the outer circumferential surface of the anode active substance 30 is in intimate contact with the inner surface at the top part of the upstanding portion 22b of the cathode can 22. The only portion not in contact with the inner surface of the cathode can 22 is that where the grooves 30b is provided.

Figure 28:
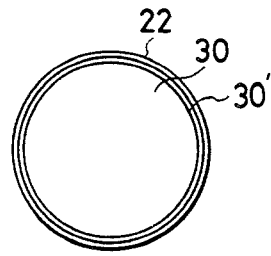
FIG. 28 is a top view of the flat battery as an example, with the anode can removed.

If the outer diameter of the anode active substance 30 are designed without the provision of the grooves 30b in such fashion that the entire outer circumferential surface of the anode active substance comes into intimate contact with the inner surface at the top part of the upstanding portion 22b of the cathode can 22, then the result would be complete elimination of the passage for venting air that is present within the cathode can 22 during the introduction of the anode active substance 30. In this case, the introduction of the anode active substance 30 is very difficult. In order to facilitate the introduction of the anode active substance 30, it may be attempted to make the outer diameter of the anode active substance 30 smaller than the inner diameter of the cathode can 22, as shown in FIG. 28, so that the outer circumferential surface 30' of the anode active substance 30 will not come into close contact with the inner surface of the cathode can 22. When this is done, however, the anode active substance 30 may shift within the cathode can 22 following the assembly of the battery and, hence, cause the separator 32 to move. The separator 32 also develops wrinkles and is likely to tear. Under such conditions an internal short-circuit may develop and, as a result, lead to self-induced deterioration.

In this modification, in order to solve these problems, the grooves 30b are provided in the anode active substance 30 as a ortion for venting air. Thus, when the anode active substance 30 is affixed by bringing its outer circumferential surface into intimate contact with the inner surface at the top part of the upstanding portion of the cathode can 22, air can escape from the grooves 30b so that the anode active substance 30 is installed within the cathode can 22 very smoothly.

Figure 29:
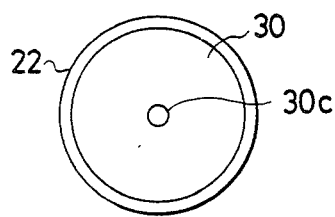
FIGS. 29 and 30 are top views of another modification of the anode active substance shown in FIG. 28.

FIG. 29 is a top view of another modification of the anode active substance shown in FIG. 28.

In this modification, the anode active substance 30 has a through-hole 30c provided for venting air at the center thereof. The outer diameter of the anode active substance 30 is set to a value as will allow the anode active substance 30 to be press-fit into the inner diameter portion at the top part of the upstanding portion 22b of the cathode can 22.

Figure 30:
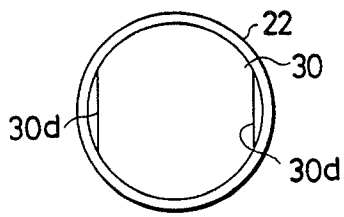

FIG. 30 is a top view of still another modification of the anode active substance shown in FIG. 27.

In this modification, the anode active substance 30 has a notch 30d provided for venting air at the outer circumferential portion thereof. The outer diameter of the anode active substance 30 is set to a value as will allow the anode active substance 30 to be press-fit into the inner diameter portion at the top part of the upstanding portion 22b of cathode can 22.

Figure 31:
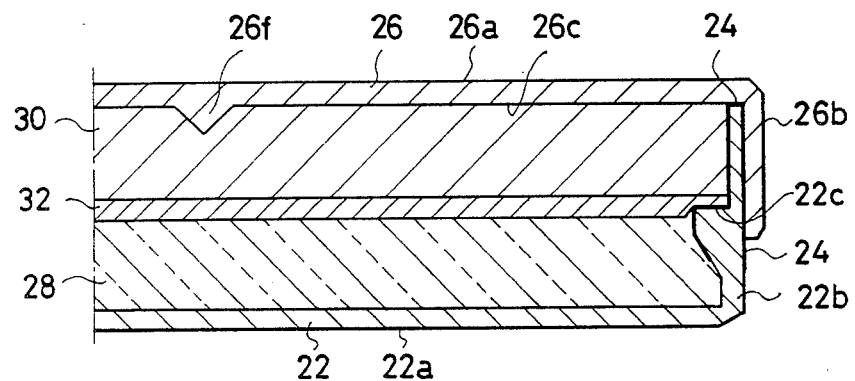
FIG. 31 is a longitudinal sectional view of another modification of the flat battery shown in FIG. 2 or 5.

FIG. 31 shows still another modified form of the flat battery shown in FIG. 2 or 5.

In this modification, a portion 26f of the anode can 26 is provided for the purpose of biting into the anode active substance 30 when the anode can 26 is fit tightly on the cathode can 22, thereby assuring good electrical contact between the anode active substance 30 and anode can 26. Without the provision of the projection 26f, the anode can 26 and anode active substance 30 are held in contact by the elasticity of the compressed separator 32 so that, when the battery is left standing for a long period of time, the firm contact between the anode can 26 and anode active substance 30 would be lost owing to a decline in separator elasticity. The result would be greater floating of voltage and a larger internal resistance. Because the anode can 26 and anode active substance 30 are substantially integrated by the projection 26f on the anode can 26 in accordance with the modification, however, it is possible to maintain highly reliable electrical contact for an extended period of time.

It should be notes that the projection 26f may be provided anywhere on the flat, inner surface 26c of the anode can 26, not just at the center thereof. Moreover, the above-mentioned effects can be obtained even if a plurality of the projections are provided.

Figure 32:
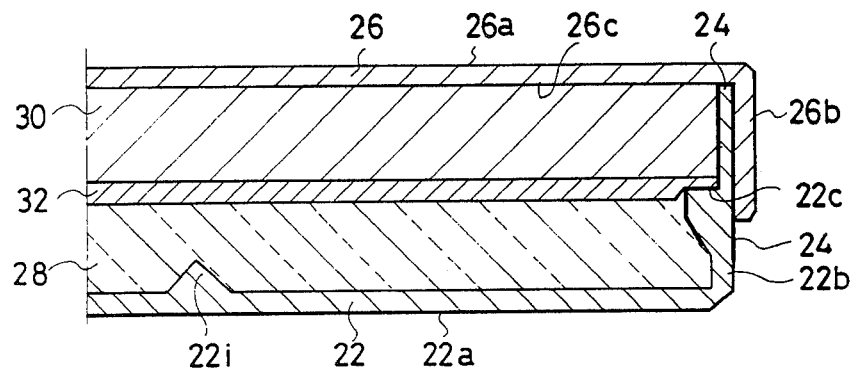
FIG. 32 is a longitudinal sectional view of another modification of the flat battery shown in FIG. 2, 5 or 31.

FIG. 32 shows still another modified form of the flat battery shown in FIG. 2, 5 or 31. In this modification, the cathode can 22 has a projection 22i at the inner surface thereof to maintain highly reliable electrical contact between the cathode can 22 and the cathode active substance 28. The above-mentioned effect can be obtained even if a plurality of the projections are provided.

Figure 33:
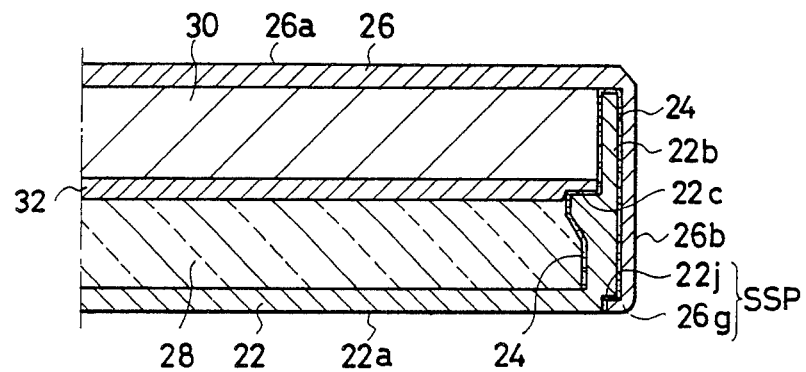
FIG. 33 is a longitudinal sectional view of another modification of the flat battery shown in FIG. 2 or 5.

FIG. 33 shows still another modified form of the flat battery shown in FIG. 2 or 5 ( a modification of the flat battery shown in FIG. 5 is only given in the following as an example.).

In FIG. 33, the cathode can 22 comprises an annular groove 22j provided at the outer root portion of the upstanding portion 22b thereof. The anode can 26 comprises a bent portion 26g formed by bending inwardly the rim of the cylindrical portion 26b thereof so as to engage the groove 22j in the cathode can 22, this being carried out after fitting the anode can 26 on the cathode can 22 by shrinkage- or press-fitting. The flat battery in this modification is assembled by placing the cathode active substance 28, separator 32 and anode active substance 30 in the cathode can 22, and fitting on the anode can 26 by shrinkage- or press-fitting. Thereafter, the lower part of the cylindrical portion 26b of the anode can 26 is deformed inwardly of the battery to provide the bent portion 26g engaging with the groove 22j, thereby forming a slip-stopping portion SSP comprising the groove 22j and the bent portion 26g. In consequence, it is possible to completely prevent a slight relative separation of the anode and cathode cans in the axial direction, even if there is an increase in internal pressure caused by the chemical reaction between the anode and cathode active substances.

Figure 34:
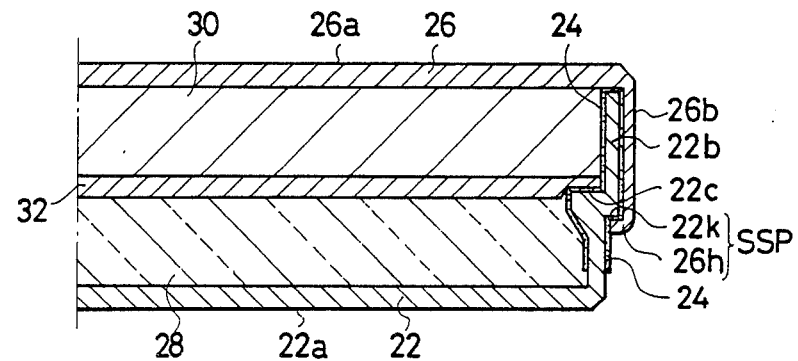
FIG. 34 is a longitudinal sectional view of a modification of the flat battery shown in FIG. 33.

FIG. 34 shows another modification of the flat battery shown in FIG. 33. In this modification, a groove 22k and bent portion 26h forming the slip-stopping portion SSP are provided near the step 22c on the upstanding portion 22b of the cathode can 22.

By so providing the slip-stopping portion SSP near the step 22c which is disposed at the middle of the inner circumferential surface of the upstanding portion 22b, there is no possibility that the end of bent portion 26h will project beyond the bottom portion 22a of the cathode can 22 when said portion 26h is bent inwardly of the battery. The bending angle thus can be selected at will. Moreover, that part of the upstanding portion 22b located below the groove 22k can be used as a guide when it is fixed in a jig or the like. Further, the groove 22k is provided at the thick portion near the step 22c, therefore, the upstanding portion 22b is not affected by bending the portion 26h.

Figure 35:
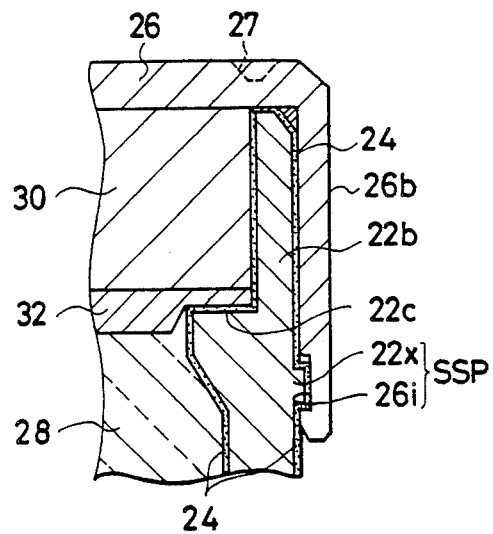
FIGS. 35 and 36 are partially enlarged views of the principal portion of another modification of the flat battery shown in FIG. 33.

FIG. 35 is an enlarged longitudinal sectional view of the principal portion of another modification of the flat battery shown in FIG. 34. The upstanding portion 22b of the cathode can 22 has an outwatdly projecting ring-shaped protrusion 22x provided at the middle portion of the outer circumferential surface thereof. The cylindrical portion 26b of the anode can 26 has a fitting groove 26i for mating with said protrusion 22x. The protrusion 22x and groove 26i form the slip-stopping portion SSP. When the anode can 26 is pressed down on the cathode can 22, the fitting groove 26i is readily snap-fit with the protrusion 22x, thereby preventing the relative separation of the cans in the axial direction. It should be noted that a ring-shaped groove 27, indicated by the broken line, is provided near the outer circumferential portion of the upper portion 26a on anode can 26 for greatly increasing the bending elasticity of the cylindrical portion 26b. The groove 27 is formed when so desired.

Figure 36:
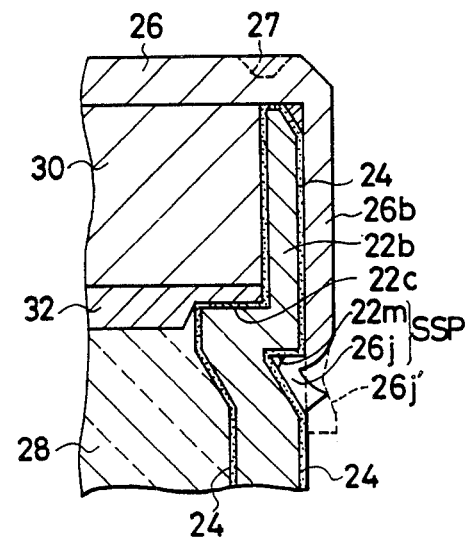

FIG. 36 shows still another form of the flat battery shown in FIG. 34 and is an enlarged longitudinal sectional view of the principal portion of this modification. The cathode can 22 has a ring-shaped channel 22m at the middle portion of the outer circumferential surface of the upstanding portion 22b. The anode can 26 has a ring-shaped notch 26j' at the cylindrical portion 26b. After assembling the cans 22 and 26, the notch 26j' is inwardly deformed at three points or along the entire circumference of the can 26 to provide an engaging portion 26j, whereby the slip-stopping portion SSP is formed by engaging the cylindrical portion 26b of the anode can 26 with the channel 22m of the cathode can 22. Thus, since the cylindrical portion 26b of the anode can 26 for engaging the channel 22m is provided beforehand with a thin wall portion 26j', the bending operation is greatly facilitated.

Figure 37:
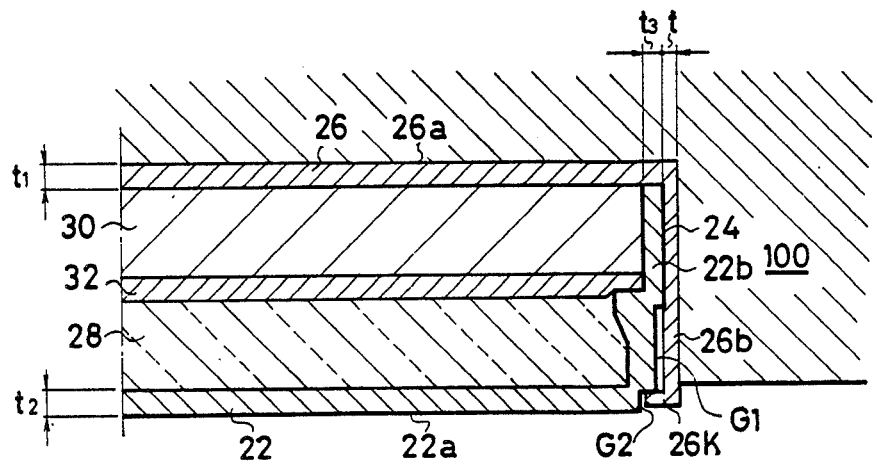
FIG. 37 is a longitudinal sectional view of another modification of the flat battery shown in FIG. 33 with a assembly jig and fixture.

FIG. 37 shows still another modified form of the flat battery shown in FIG. 33.

In this modification, a first groove portion $G_1$ is provided in the outer circumferential surface of the upstanding portion 22b of the cathode can 22, and a second groove portion $G_2$ is provided continuous with the first groove portion $G_1$.

The cathode and anode cans are assembled as following manner. After the cylindrical portion 26b of the anode can 26 is fitted on the upstanding portions 22b of the cathode can 22 by shrinkage- or press-fitting, the bent portion 26k is formed for engaging the second groove portion $G_2$ of the upstanding portion 22b by inwardly bending the rim of the cylindrical portion 26b, with the cylindrical portion 26b being guided along substantially its entire length by the metal mold 100. During this forming operation, that part of the cylindrical portion 26b corresponding to the first grooved portion $G_1$ is allowed to retreat into the groove portion $G_1$ while that part of the upstanding portion 22b above the first grooved portion $G_1$ remains in pressing contact with the cylindrical portion 26b. Accordingly, the upstanding portion 22b is not subjected to an inwardly directed counterforce applied by the cylindrical portion 26b, whereby the upstanding portion 22b of the cathode can 22 is not urged inwardly of the battery owing to a counterforce exerted by the cylindrical portion 26b resulting from the bending work applied to the bent portion 26k. The battery diameter therefore is not enlarged after the bent portion 26k is formed, and leakage does not occur. Further, the height of the battery is stabilized.

In this modification (FIG. 37), in order to facilitate the bending work for the bent portion 26k and completely prevent the cans deformation which is a cause of leakage, the thickness t of the cylindrical portion 26b is one-half the thickness $t_1$ of the upper portion 26a of anode can 26, and one-half the thickness $t_2$ of the bottom portion 22a of cathode can 22 (where $t_2=t_1$ in the modification). Further, the thickness t is less than the thickness $t_3$ of the upstanding portion 22b.

Figure 38:
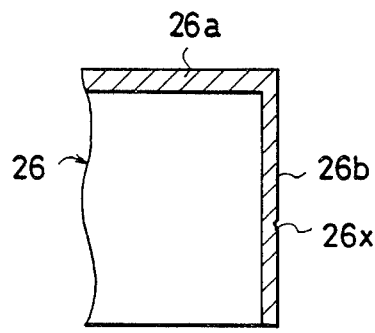
FIG. 38 is an enlarged view of the principal portion of another modification of the flat battery shown in FIG. 33.
Figure 39:
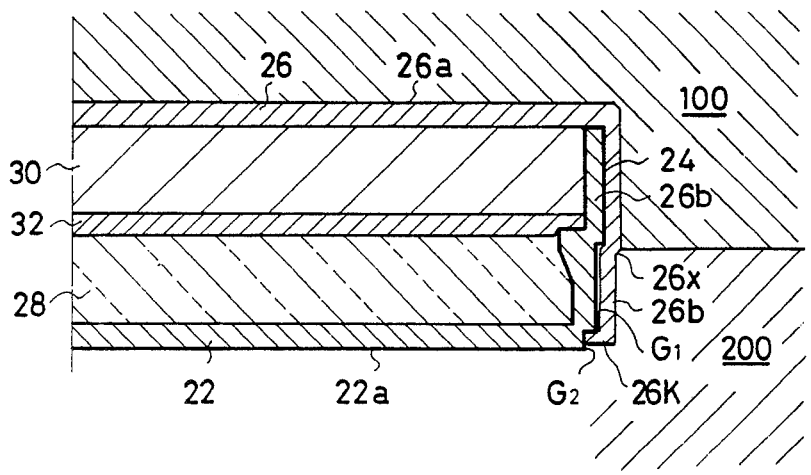
FIG. 39 is a longitudinal sectional view of the flat battery shown in FIG. 38 for illustrating the state which is deformed the anode can using metal mold and die.

Also, as shown in FIGS. 38 and 39, a notched portion 26x is provided at the middle part of the outer circumferential surface of the cylindrical portion 26b. Then, after the cylindrical portion 26b is fitted onto the upstanding portion 22b by shrinkage- or press-fitting, the guide portion of the metal mold 100 is positioned up to the notched portion 26x And using a bending die 200, that part of the cylindrical portion 26b below the notch 26x is inwardly deformed in its entirely, during which time the bent portion 26k is subjected to bending work. By virtue of such an operation, the formation of the bent portion 26k is facilitated, and it is possible to completely prevent the cans deformation of the type that invites leakage.

Figure 40A:
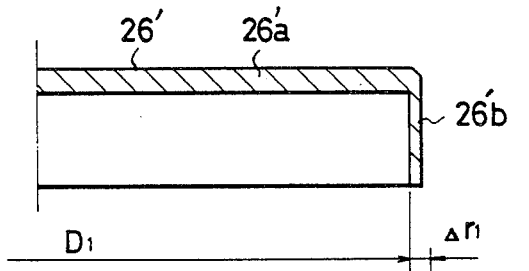
FIGS. 40 A, B and C are longitudinal sectional views of steps of the fitting operation of the anode can with prior deformation onto the cathode can.
Figure 40B:
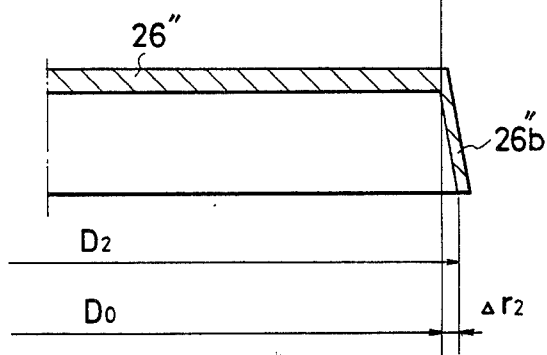

FIGS. 40A, B and C show another modified form of the anode can shown in the other figures. Like elements corresponding to those of the other figures are indicated by like numerals.

Figure 40C:
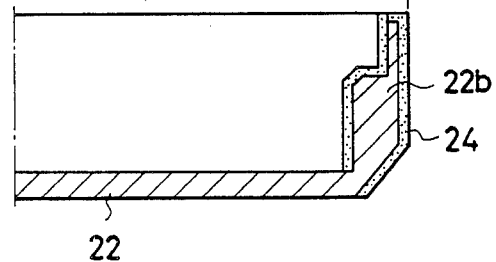

In FIG. 40A, numeral 26' denotes an anode can member comprising an Ni-Ti one-way shape memory alloys with a martensitic transformation starting temperature Ms of 60° to 90° C., and a martensitic transitic transformation finishing temperature Mf of less than 50° C. A cylindrical portion 26' extends vertically downwardly from the upper portion 26'a of the anode can member 26' and has an inner diameter $D_1$ which is approximately 5% ($\Delta r_1$) smaller than the outer diameter Do of the upstanding portion 22b of the cathode can 22 shown in FIG. 40C. By spreading the cylindrical portion 26'b under temperature conditions where the temperature is below Mf, the anode can member 26' is converted into an opened cup-shaped anode can 26" the cylindrical portion 26"b whereof is larger than the outer diameter Do of the upstanding portion 22b of cathode can 22 by 1 to 3% ($\Delta r_2$). After the cathode active substance, separator and anode active substance are successively putted into the cathode can 22, the opened cup-shaped anode can 26' is disposed on the assembly and heating is carried out at a temperature above the Ms point (70° to 100° C.). When a reverse transformation occurs, the anode can 26 reverts back to the shape of the anode can member 26', so that the upstanding portion 22b of the cathode can 22 is compressed the cylindrical portion 26b of the anode can 26 to affix the two tightly together.

Figure 41:
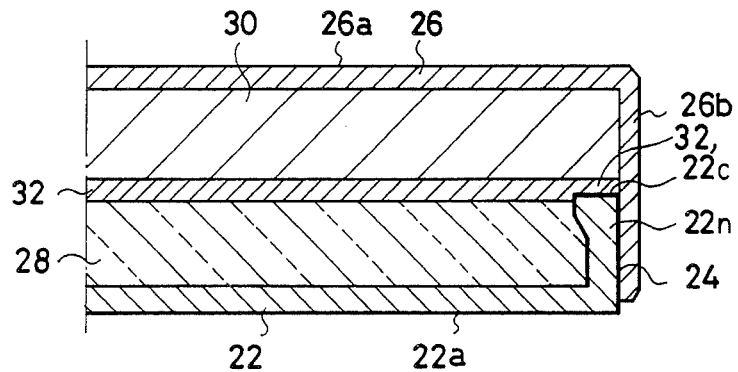
FIG. 41 is a longitudinal sectional view of another modification of the flat battery shown in FIG. 2.

FIG. 41 shows another preferred embodiment of a flat battery according to the present invention, with like parts bearing the same reference numerals as those used in FIG. 2 or 5.

In this embodiment, the cathode can 22 comprises an upstanding portion 22n extending vertically upward from the outer circumference of the bottom portion 22a to the middle portion of the cylindrical portion 26b of the anode can 26. An upper surface 22'n of the upstanding portion 22n supports the outer circumferential portion of the separator 32.

In this embodiment, volume of the anode active substance 30 can be increased by eliminating an upper portion of the upstanding portion 22n of the cathode can 22.

Figure 42:
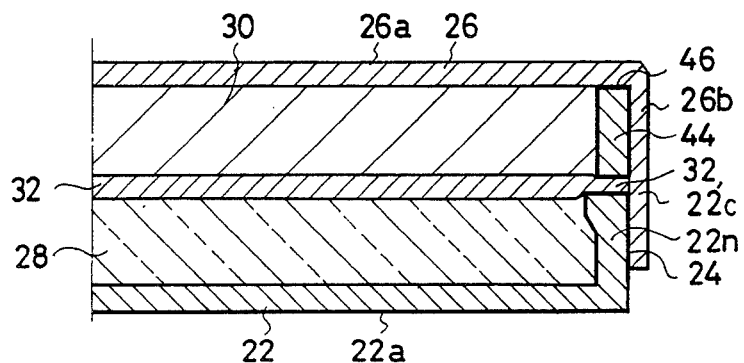
FIG. 42 is a longitudinal sectional view of a modification of the flat battery shown in FIG. 41.

FIG. 42 shows a modification of the flat battery shown in FIG. 41. The flat battery in this modification comprises a ring member 44 coated with an insulative film 46. The ring member 44 is composed of a plastic material. The contents of the insulative film 46 and the insulative film 24 shown in FIG. 2 or 5 are the same. In this modification, the separator 32 is sufficiently compressed by providing the ring member 44 between the upper portion 26a of the anode can 26 and the upper step 22'n of the upstanding portion 22. Thus, the leakage is prevented by the compressive counterforce of the separator 32.

Figure 43:
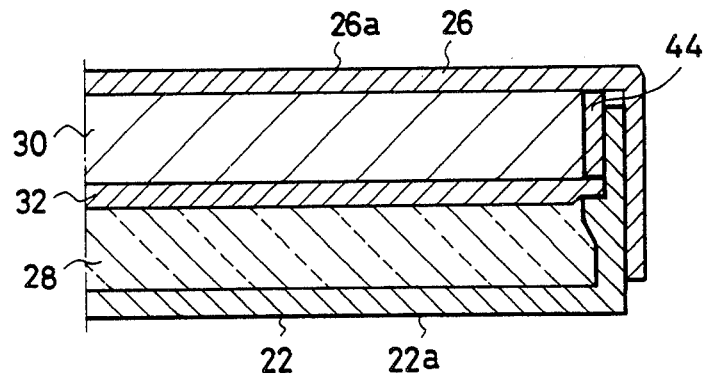
FIG. 43 is a longitudinal sectional view of the flat battery shown in FIG. 5, in which the circular part is utilized.

It is possible to use the ring member 44 in the flat battery shown in FIG. 5 in order to prevent sufficiently the leakage, as shown in FIG. 43.

Figure 44:
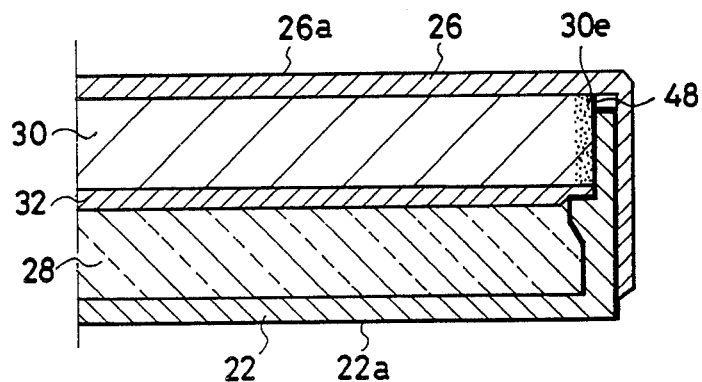
FIG. 44 is a longitudinal sectional view of a modification of the anode active substance shown in the other figures.

FIG. 44 shows a modification of the anode active substance shown in the other figures. In this modification, an anode active substance comprises insulative film 48 coating an outer circumferential surface thereof and a compound portion 30e including a resin. If the insulative film 24 has pinholes, the insulative film 48 covers the pinholes of the insulative film 24, whereby the inner short-circuit of the battery is prevented.

In accordance with the present invention as described above, a highly stable flat battery can be obtained wherein the battery volume can be used effectively so that it is possible to increase battery capacity and perfect a leak-proof property, thereby providing an improvement in the reliability of the flat battery.

I claim:

1. A flat battery comprising:
   a cathode can including a bottom portion, cylindrical upstanding portion extending upward from the outer circumference of said bottom portion and a step portion provided at an inner part of said upstanding portion;
   an insulative film continuously coating surfaces of from said step portion to an outer surface of said upstanding portion;
   a cathode active substance electrically contacted to said cathode can;
   an anode can including an upper portion and a cylindrical portion extending downward from the outer circumference of said upper portion;
   an anode active substance electrically contacted to said anode can; and
   a separator having an outer circumferential portion set on said step portion and isolating said cathode active substance and anode active substance to prevent an electrical short-circuit;
   wherein said cylindrical portion of said anode can is shrinkage-fitted onto said cylindrical upstanding portion of said cathode can through the intermediary of said insulative film.

2. A flat battery according to claim 1, in which said cylindrical upstanding portion of said cathode can has a distance from said step portion to an upper surface thereof in which the distance is less than the total thickness of said anode active substance and said separator.

3. A flat battery according to claim 1, further comprising a space portion between the upper surface of said cylindrical upstanding portion of said cathode can and a bent root of said cylindrical portion of said anode can and a sealing material provided in said space.

4. A flat battery according to claim 1, in which said insulative film includes glass beads, each of said glass beads having a diameter greater than the total roughness of the surfaces of said cathode can and anode can.

5. A flat battery according to claim 1, further comprising an insulative metal oxide layer provided on an inner circumferential surface of said cylindrical portion, in contact with the outer surface of said cylindrical upstanding portion of said cathode can.

6. A flat battery according to claim 1, further comprising a metal plate having a low thermal conductivity, said metal plate being provided between said upper portion of said anode can and said anode active substance.

7. A flat battery according to claim 1, in which said anode active substance comprises a graphite layer at the top part thereof.

8. A flat battery according to claim 1, in which said anode can comprises a plurality of annular grooves provided at the inner peripheral surface of said cylindrical portion thereof.

9. A flat battery according to claim 8, in which said cathode can comprises a plurality of annular grooves provided at the outer circumferential surface of said upstanding portion thereof and corresponding to the annular grooves of said anode can.

10. A flat battery according to claim 1, in which said cathode can has at least one air venting portion provided in an upper portion of said cylindrical upstanding portion of said cathode can.

11. A flat battery according to claim 1, in which said anode active substance has at least one groove provided at the outer circumferential surface thereof for venting air.

12. A flat battery according to claim 1, in which said anode active substance has a through-hole provided at the center thereof for venting air.

13. A flat battery according to claim 1, in which said anode active substance has a notch provided at the outer circumferential portion thereof for venting air.

14. A flat battery according to claim 1, in which said anode can has at least one projection provided at the inner surface of said upper portion thereof for assuring good electrical contact between said anode active substance and anode can.

15. A flat battery according to claim 1, in which said cathode can has at least one projection provided at the inner surface of said bottom portion thereof for assuring good electrical contact between said cathode active substance and cathode can.

16. A flat battery according to claim 1, in which said cathode can includes an annular groove provided at a root portion of said upstanding portion thereof, and in which said anode can includes a bent portion formed at a rim of said cylindrical portion thereof and engaging said annular groove of said cathode can.

17. A flat battery according to claim 16, in which said annular groove of said cathode can is provided near the step portion of said cathode can.

18. A flat battery according to claim 1, in which said cathode can includes a ring-shaped protrusion provided at the middle portion of said outer circumferential surface thereof, and in which said anode can includes a groove formed at the inner surface of said cylindrical portion thereof and engaging said protrusion of said cathode can.

19. A flat battery according to claim 1, in which said cathode can includes a ring-shaped channel provided at the middle portion of the outer circumferential surface of said upstqanding portion thereof, and in which said anode can includes a ring-shaped notch at said cylindrical portion thereof and engaging said channel of said cathode can.

20. A flat battery according to claim 1, in which said cathode can includes a first grooved portion provided in the upstanding portion and a second grooved portion provided continuous with said first grooved portion, and in which said anode can includes a bent portion formed by inwardly bending a rim of said cylindrical portion and engaging said second grooved portion.

21. A flat battery according to claim 1, in which said anode can comprises an Ni-Ti one-way shape memory alloys.

22. A flat battery according to claim 1, further comprising a ring member disposed between the inner surface of said upper portion of said anode can and the upper surface of said step portion of said cathode can for compressing said separator being interposed between the upper surface of said upstanding portion of said cathode can and said ring member.

23. A flat battery according to claim 1, further comprising a ring member disposed between the inner surface of said upper portion of said anode can and the step portion of said cathode can for compressing the separator being interposed between the step portion of said upper portion and said ring member.

24. A flat battery according to claim 1, in which said anode active substance has an outer cylindrical surface coated with said insulative film.

25. A flat battery according to claims 1 or 24, in which said insulative film is composed of one of fluorine-, silicon-, polyamide-, polyphenylene sulfide- and polyimide-based materials.

26. A flat battery according to claim 1, in which said anode active substance has a compound portion including a resin.

* * * * *